United States Patent [19]

Buchanan

[11] Patent Number: 4,967,354

[45] Date of Patent: Oct. 30, 1990

[54] METHOD OF PREPARING CUSTOMIZED WRITTEN EXAMINATIONS

[75] Inventor: William W. Buchanan, Arlington, Va.

[73] Assignee: Tescor, Inc., Reston, Va.

[21] Appl. No.: 63,504

[22] Filed: Jun. 18, 1987

[51] Int. Cl.[5] .......................... G09B 5/02; G09B 7/00
[52] U.S. Cl. ................................... 364/419; 434/335; 434/350
[58] Field of Search ................. 434/335, 350; 364/419

[56] References Cited

U.S. PATENT DOCUMENTS

| | | | |
|---|---|---|---|
| 3,643,348 | 2/1972 | Azure | 434/353 |
| 4,609,358 | 9/1986 | Sangster | 434/350 |
| 4,705,479 | 11/1987 | Maron | 434/335 |

FOREIGN PATENT DOCUMENTS 0842924  7/1981  U.S.S.R. ............................. 434/335

OTHER PUBLICATIONS

"Handy Guide to Orbit"; P. section 6.

Dennis Deck, Phil Nickel, Gary Estes, "Reviews of Microcomputer Item Banking Software", Nov. 1985.

*Primary Examiner*—Michael R. Fleming
*Assistant Examiner*—Gail O. Hayes
*Attorney, Agent, or Firm*—Kokjer, Kircher, Bradley, Wharton, Bowman & Johnson

[57] ABSTRACT

A method of constructing written educational tests at the local school district level from validated test questions linked to statements of specific learning objectives in a data base recorded on compact laser discs. A laser disc player operated by the educator who is formulating the test displays and edits the available questions in selected topics on a visual monitor. The questions which are displayed may be selected at the local level to reflect the actual content of the course which is being examined. After all questions have been selected, they can be downloaded (including graphics) to a laser printer which prints professional quality test booklets at the local site. Alternatively, reference to the selected questions (numbers) can be downloaded onto a floppy disc which is transported to a service bureau for printing of the test booklets there. The test results can be scored locally and test reports can be printed locally.

4 Claims, 1 Drawing Sheet

METHOD OF PREPARING CUSTOMIZED WRITTEN EXAMINATIONS

BACKGROUND OF THE INVENTION

This invention relates generally to the field of educational testing and more particularly to the preparation of customized examination booklets containing validated written questions which are linked to statements of specific learning objectives.

Traditionally, the written examinations that are administered at all levels of school systems and other educational institutions have been prepared by the teacher for each particular class based on the content of the material that has been covered in the class. The need to prepare such tests places a considerable burden on teachers and consumes time that could be spent more productively on other things. In addition, many teachers are not skilled in the preparation of fair and accurate test questions, due to lack of experience, training or other qualifications. As a consequence, the teacher prepared tests do not always validly test the students' mastery of the subject matter.

More recently, so called standardized or "shelf tests" have been available. The shelf tests are usually prepared by test publishers or testing specialists and in this respect are somewhat superior to teacher prepared tests. However, the shelf test by necessity must be fairly general and must assume that certain material has been presented in a particular course. If in fact the material has not been covered in the course, the test will include questions that are directed to subjects that have not been taught. Conversely, if material is presented in class that is not made the subject of questions on the shelf test, the test results do not validly reflect knowledge of all material that has been presented to the students. Thus, shelf tests often do not accurately test the material that has been covered in a particular subject.

One major feature of the standardized tests is that they are scored and interpreted in comparison to national "norms" which, as explained above, are bound to be misleading to the extent that these tests do not reflect what is being taught in every district or region in the country.

Moreover, this situation has also been criticized by the National Education Association and others are prompting educators to "teach to the test". It is the object of the present invention to enable education to test what is being taught in each district or region.

SUMMARY OF THE INVENTION

The present invention is directed to a method by which teachers and other educators can prepare custom tailored tests which measure mastery of their own curricular objectives using questions which have been previously validated against the same or similar objectives. In accordance with the invention, a data base containing a large number of statements or objectives and validated test questions on a variety of subjects and a variety of levels is assembled. Preferably, the data is stored on a compact laser disc because of its high capacity and the resultant fact that graphics can be stored on the disc along with text. The questions that are recorded on the disc are all previously validated by exhaustive field testing, thus providing assurance as to their validity.

A local school district or other educational institution is provided with the disc, and the entire data base is thus made available at the local level. A laser disc player and a visual monitor at the local site permit the questions relating to any topic to be displayed to a teacher or other person who is to author a particular test. Various types of searching techniques can be employed to locate or match statements of specific learning objectives and then to locate questions in the data base which relate to those particular objectives. Items and objectives can also be retrieved by grade level, subject, topic, key word or other parameter or combination of parameters. The author can then select one or more of the questions which measure mastery of the selected objectives on a particular subject or topic, and the questions are thus chosen at the local level in accordance with the subject matter that has actually been covered in the local courses.

After the teacher has selected all of the questions that are to be included in the test, a test booklet can be prepared immediately at the local site by a laser printer which produces attractive, high quality, professional appearing booklets in a selection of font sizes and in one or two column formats. Alternatively, the selected questions can be recorded on a floppy disc or other storage medium which is then transported through the mail or otherwise to a service bureau that actually prints the test booklets and furnishes them to the school. It is also possible for the selected questions or numerical designations therefor to be transmitted via telephone lines or other mode of transmission to the service bureau. In any case, the result of the process is a professional test booklet containing test questions that have all been previously validated and selected at the local level.

It is a feature of the invention that the test results can be scored and reported either at the local site of the school, at the school district headquarters, or at the service bureau. If the test reports are to be prepared by the school or school district, the completed answer sheets are scanned by electronic scanning equipment and the results of the scanning are processed by a local computer using special software which is used to operate a printer which prints a variety of reports which analyze the test scores. The test reports can be prepared locally even if the test booklets themselves are printed at the service bureau.

It is another feature of the invention that each question in the data base can be edited at the local level. Consequently, the questions can be tailored to the particularities of the course coverage of various topics. In addition, local control over the content, printing quality and interpretation of the test results is provided. The data base is periodically updated cumulatively, with the addition of new data banks of questions and the addition of new questions to existing question banks. All software is also updated and maintained in order that the latest versions are always on the current cumulative disc.

DETAILED DESCRIPTION OF THE INVENTION

In the accompanying drawing which forms a part of the specification and is to be read in conjunction therewith and in which like reference numerals are used to indicate like parts in the various views.

Figure 1:
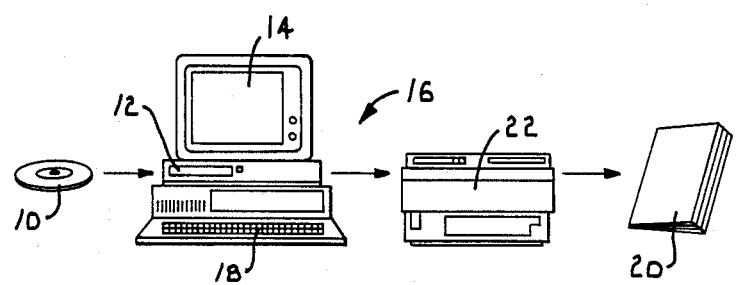
FIG. 1 is a diagrammatic view which illustrates schematically the equipment used in the preparation of customized educational tests in accordance with the method of the present invention.

Referring now to the drawing in more detail and initially to FIG. 1, the present invention provides a method by which custom tailored educational tests can be prepared based on the learning objectives and the questions contained in a data base which is stored in optically encoded form on a compact laser disc 10. The laser disc 10 has a storage capacity of 550 megabytes, and a large number of questions on various topics can thus be entered and stored on the laser disc 10. In addition, the laser disc has the ability to store graphics, and some of the questions in the data base preferably include graphics.

The data base which is entered on the compact laser disc 10 includes a number of questions on each of the various learning objectives, topics and educational levels that are covered. The questions included in the data base are validated by exhaustive field testing and are assembled by a service bureau that records the data base on the laser disc. The information which is stored on the disc 10 can be retrieved by inserting the disc into a laser disc player 12 which is able to "read" the encoded data (the objectives and the questions including graphics) on the disc and visually display them on a monitor such as the visual monitor 14 included in a "personal computer" 16 which may be of the "XT" or "AT" class. The personal computer 16 includes a keyboard 18 which is used to enter commands and perform other functions. Local school districts and others who prepare tests typically have access to a personal computer. It is contemplated that the laser disc player 12 will be furnished to the school district by the service bureau which furnishes the laser disc 10, although the school district may have its own laser disc player.

The laser disc 10 is provided with search software which facilitates access to the objectives and questions which are included in the data base. The teacher or other educator who is to author a test selects the category of each objective (e.g., subject, grade level). A variety of searching techniques such as "Boolean" searching can be provided alone or in various combinations. For example, if a teacher of a tenth grade biology course is attempting to construct a test which includes questions relating to a local learning objective which involves the "identification of the structure and functions of the cell", such questions can be located by first locating the most closely related objectives by entering the course level (10th grade) and the subject or domain name (biology). Next, key word searching of all objective statements can be undertaken to determine the number of objectives in the data base at this grade level and in this course topic that contain the various key words in descending order of generality such as "cell", "structure", and "function". By successively entering these key words following entry of the grade level and course topic, the search software may determine that there are three objectives in the data base which include the three key words and which fall within the grade level and subject. This fact will be displayed on the monitor 14, and the teacher can then use the keyboard 18 to cause a display of the three applicable objectives. They may be (1) "describe the structure of cells and illustrate their functions", (2) "list the cell structures and their functions", and (3) "define eukaryotic cells and describe their structure and functions".

When the applicable objectives are displayed on the monitor 14, the user can select one or all of them by selecting the appropriate function key on the keyboard. Once the objective (or objectives) has been selected, the user can display all of the questions which have already been used (validated) to test mastery of that (or those) objectives. If no satisfactory objective is located, the user may conduct separate keyword searches for items only. Each question that is selected is displayed on the monitor 14, along with additional background data such as the correct answer, the P-values (if applicable), the Rasch-calibrations (if applicable), taxonomy information (if included), teacher instructions, and the presence of graphics. If the presence of a graphic is indicated for an item, it can be retrieved and displayed by depressing another appropriate function key on the keyboard 18. The graphic will also be printed on the test page itself, as will subsequently be described.

The teacher or other educator proceeds to search and display on the visual monitor the objectives and questions which relate to other topics within the subject matter that is to be tested, and additional questions are selected in the manner previously described. Eventually, all of the questions that are to be included in the test will have been selected from those available in the data base recorded on the laser disc. The questions can be edited and supplemented if desired.

The actual test booklets 20 may be prepared at the local site by downloading the selected and edited questions to a laser printer 22 which is operated by the computer 16. The laser printer 22 is able to print a high quality, professional looking test booklet which includes graphics associated with each question to which a graphic is provided. The test booklets 20 can be printed in the quantity necessary to serve the number of students who are to take the test or camera ready copies from the laser printer can be used as "masters" to reproduce any number of copies at a local center on standard office copiers.

Figure 2:
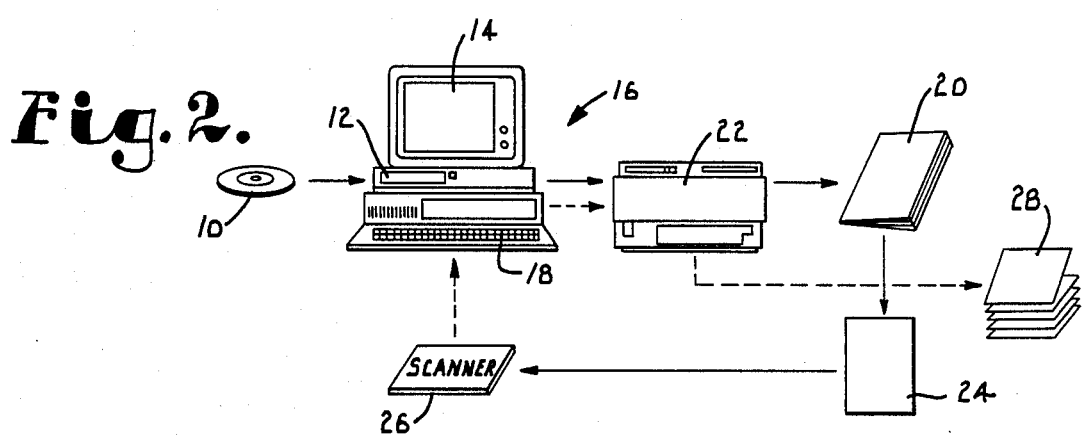
FIG. 2 is a diagrammatic view similar to FIG. 1 but showing additional materials and equipment that may be used in the method of the present invention.

Referring now to FIG. 2, each student who takes the test printed in the test booklet 20 fills in an answer sheet 24 which is of the type that may be scanned by a conventional optical mask reader (OMR) or optical character resignator (OCR) scanner 26 which is able to determine which questions have been answered correctly and which have been answered incorrectly. The information as to correct and incorrect answers may be input by the scanner 26 into the computer 16. The computer, under the control of suitable software, can then operate the printer 22 which prints various types of test reports. It is noted that the test booklets 20 are all prepared locally and that all scoring and test report printing is also done locally. It should be noted that the preparation of the test booklets and the test reports can be carried out either at each school or at school district headquarters. In the latter case, only a single laser printer is required at the district headquarters and there is no need for the high cost printing equipment at each school. In any event, all of the test preparation, printing, scoring and printing of reports is done at the local level.

The test reports 28 may be of a variety of types. For example, one report may list the students in alphabetical order with the test scores broken down for each student in various fashions. In addition, an overall class report may be provided, and an administrative summary report may likewise be provided.

Figure 3:
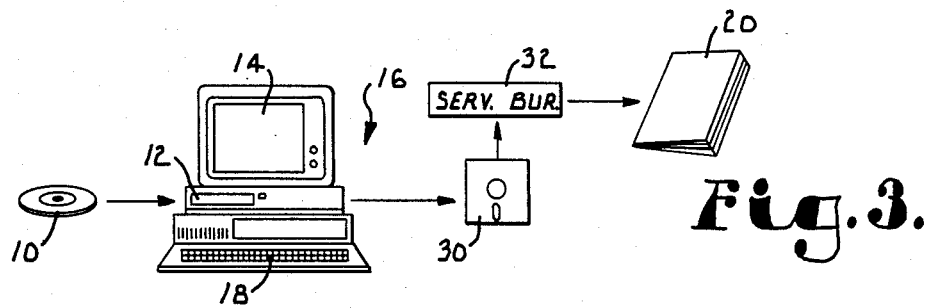
FIG. 3 is a diagrammatic view showing materials and equipment that may be used in an alternative method for preparing tests in accordance with the invention.

FIG. 3 illustrates an alternative manner for printing of the test. Again, a teacher or other educator selects the questions which are to be included on the test at the local level. However, instead of printing the test booklets 20 at the local site, information specifying the questions which are to be included on the test (e.g., item number) is downloaded by the computer 16 onto a "floppy" disc 30 which stores the information in magnetically encoded form. Another type of storage medium such as a "hard" disc or magnetically encoded tape may be provided in place of the or for use with the floppy disc. The storage medium 30 may be transmitted through the mail or otherwise transported to a service bureau 32 which has all of the equipment necessary to retrieve the encoded data from the storage medium 30 (using the item number) and use the retrieved data to print the test booklets 20. The test booklets are then mailed or otherwise transported from the service bureau 32 back to the local school district for administration of the tests there. Alternatively, camera ready copies may be sent to the school for duplicating on office copiers.

In the system shown in FIG. 3, the objectives and questions which are to be included in the test are again selected at the local level, although the actual printing is done at the service bureau. This eliminates the need for the local school district to invest in a laser printer, although it does require that the floppy discs 30 or other storage media be transmitted to the service bureau and that the finished test booklets be transported back to the school district.

It should be noted that the information as to which questions have been selected (e.g., item numbers) can be transmitted by modem over the telephone lines to the service bureau rather than requiring entry onto a storage medium such as the floppy disc 30. It should also be noted that within a single school district, the questions which are selected for each test can be transmitted to the district office via floppy discs or modem for printing of the tests at the district office by a laser printer located there.

Figure 4:
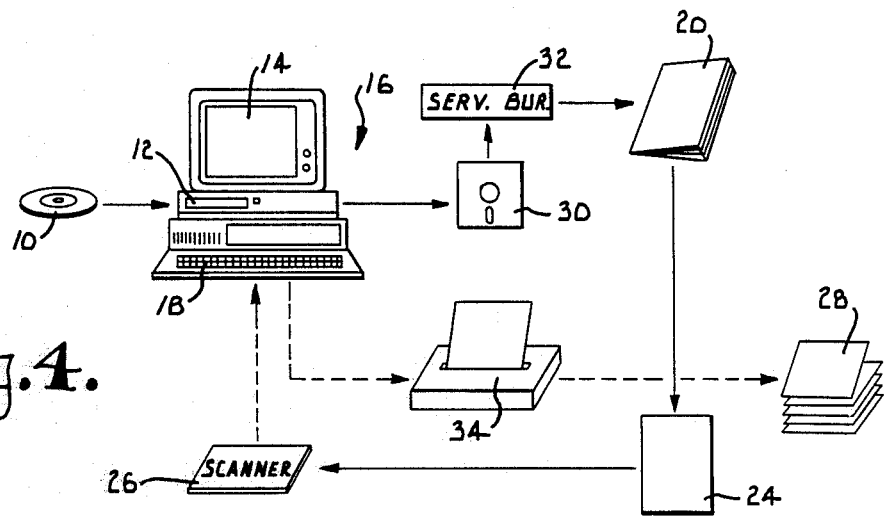
FIG. 4 is a diagrammatic view of materials and equipment that may be used in still another method of preparing tests according to the invention.

Referring now to FIG. 4, even when the test booklets 20 are printed at the service bureau 32, it is still possible for the test results to be scored and reported at the local school district or other local site. Again, the answer sheets 24 that are filled out by the students taking the examination are scanned by the scanner 26 to determine which questions have been answered correctly and which have been answered incorrectly. Again, the data is entered into the computer 16 by the scanner 26. However, rather than requiring preparation of the test reports by the expensive laser printer 22, the computer 16 may be used to operate a less expensive printer such as the printer 34 shown in FIG. 4. The less expensive printer 34 is fully capable of preparing and printing all of the test reports 28 that can be printed by the laser printer. This allows local scoring and printing of the test results without the need for investment in a laser printer.

It should be noted that the answer sheets and test booklets can be transmitted to the service bureau for scoring and printing of the reports if desired.

It is thus apparent that in accordance with the method of the present invention, all of the questions which are to be included in the test booklet 20 are selected at the local level by a teacher or other educator who has actual first hand knowledge of the material that has been presented in the course which is being tested. Consequently, questions which cover other material will not be included in the test, and the teacher can select those questions which best examine mastery of the subject matter that has actually been taught. In addition, since all of the questions which are stored on the laser disc 10 have been validated by exhaustive field testing, complete assurance is provided of the validity of all of the questions that are included in the test booklet 20. The method of the present invention provides local control over the content of each test, the quality of the printing, and the preparation and interpretation of the test results. At the same time, each test can be prepared quickly and easily without undue consumption of valuable time of teachers and other educators.

It should be noted that each question which is selected may be edited by the teacher prior to being downloaded to the laser printer or floppy disc, and the questions can thus be custom tailored to fit the peculiarities of geographical areas or even of each teachers' particular style of teaching. This can be done without destroying the validity of the question, and the test results thus accurately measure the knowledge of the students of the subject matter that has been taught. In addition to the ability to edit each question, questions which are not included in the data base can be selected by entering the questions on the keyboard 18 prior to downloading of the test questions.

It is contemplated that a number of the laser discs will be prepared and furnished to the various school systems which will make use of the data base to prepare customized examinations. Thus, in accordance with the present invention, a single data base can be used by widely scattered school systems to produce different tests, each locally prepared and each containing validated questions which test the knowledge of students as to material actually covered in the course that is tested.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A method for formulating customized educational tests at a plurality of different sites remote from each other, said method comprising the steps of:
    assembling at a service bureau a plurality of statements of learning objectives which are linked to previously validated test questions for each subject category which the tests may cover;
    storing the objective statements and test questions in encoded form on a storage medium from which the questions may be retrieved;
    providing at each site a visual monitor on which the objectives and test questions may be displayed;

using the storage medium to display on the monitor at each site the objectives and questions in categories selected at the site;

selecting at each site one or more objectives and questions from each category displayed on the monitor; and printing for each site a test booklet containing only the questions selected at the site, whereby each test booklet contains questions selected at the site at which type booklet is to be used, said printing step comprising recording questions selected at each site on a storage device which stores the selected questions in magnetically encoded form, transporting each storage device to a service bureau, retrieving the selected questions from each storage device at the service bureau to which it is transported, printing the questions from each storage device in a test booklet at the service bureau, and furnishing to each site the test booklet which contains the questions selected at the site.

2. The method of claim 1, wherein each test booklet includes an answer sheet on which answers to the questions in the booklet are to be entered, and including the steps of:

scanning each answer sheet at the site at which answers are entered to determine the accuracy of the answers; and printing at each site a test report containing a report on the accuracy of the answers on each answer sheet having answers entered thereon at the site.

3. A method of formulating from a plurality of validated test questions, a plurality of customized educational tests each to be used at a different site, said method comprising the steps of:

recording statements of learning objectives and the questions in encoded form on a plurality of laser disks at a service bureau;

transporting one of the laser disks from the service bureau to each site at which a test is to be formulated;

providing a laser disk player and a visual monitor at each site;

using the laser disk player at each site in a manner to retrieve the objective and questions from selected categories and display the retrieved objectives and questions on the visual monitor at the site;

selecting at each site one or more of the objectives or questions from each category displayed on the monitor;

recording the selected objectives and questions at each site on a storage medium which stores the objectives and the questions in magnetically encoded form;

transporting each storage medium from the site to a service bureau;

retrieving the selected questions from each storage medium at the service bureau to which it is transported;

printing the questions from each storage medium in a test booklet; and furnishing to each site the test booklet containing the questions selected at the site.

4. The method of claim 3, wherein each test booklet includes an answer sheet in which answers to the questions in the booklet are to be entered, and including the steps of:

scanning each answer sheet at the site at which answers are entered to determine the accuracy of the answers; and printing at each site a plurality of test reports containing analysis of the scores on the accuracy of the answers on each answer sheet having answers entered thereon at the site.

* * * * *